INVENTOR
HENRI B. DIAMANT

INVENTOR
HENRI DIAMANT

MAGNETIC READING/WRITING CIRCUIT AND CHANNEL SELECTOR THEREFOR

Filed March 7, 1961

INVENTOR
HENRI DIAMANT

United States Patent Office 3,092,817

Patented June 4, 1963

3,092,817
MAGNETIC READING/WRITING CIRCUIT AND CHANNEL SELECTOR THEREFOR

Henri B. Diamant, State College, Pa., assignor to HRB-Singer, Inc., State College, Pa., a corporation of Pennsylvania Filed Mar. 7, 1961, Ser. No. 94,053
10 Claims. (Cl. 340—174.1)

This invention relates to a magnetic reading/writing circuit and more particularly to a multiple channel circuit in which a plurality of magnetic heads are direct-coupled to a common input/output circuit. The invention also relates to a channel selector system for selectively coupling any one of a plurality of windings to a common input or output circuit. Although the latter feature of the invention is applicable to time multiplexing and commutation circuits, it is particularly useful in magnetic reading/writing circuits such as found, for example, in digital computers that utilize magnetic drum or tape storage elements.

In magnetic drum memory systems, information is recorded on a plurality of narrow tracks, or channels, that are spaced along the axis of the drum. Each channel is equipped with its own reading and writing heads, which can be driven from a common amplifier circuit by means of a channel selector system that (1) normally isolates all of the heads from the common amplifier circuit, (2) selects one of the heads in response to a channel address signal that signifies the desired channel, and (3) connects the selected head to the common amplifier circuit. And, since reading and writing usually occur at different times in a computer, it is also possible to use a combined reading/writing head for each channel instead of using separate heads for reading and writing. In this arrangement, the channel input and output signals are developed across a single winding that serves as a reading coil when it is connected to the input of a reading amplifier and as a writing coil when it is connected to the output of a writing amplifier. The use of combined reading/writing heads is highly desirable because it not only halves the number of heads required in a computer, but also simplifies the channel selector system, the synchronizing system, and the reading/writing circuits.

There is, however, one notable difficulty encountered in the use of combined reading/writing heads, and this is that writing involves relatively large currents while reading involves relatively small currents. The transfer of energy between the magnetic heads and the surface of the drum is very inefficient, so that large currents must be driven through the writing coil to magnetize the drum surface, while the resulting magnetization will only induce small currents in the reading coil. Therefore, when the reading and writing heads are combined, the circuit must be adapted to operate effectively at both high and low current levels. This is not particularly troublesome in the heads themselves, since it is easy to design windings that operate over a wide current range, but it is a major problem in the output circuit of the writing amplifier and the input circuit of the reading amplifier. The impedance requirements for a high current output are incompatible with those for low current input; therefore, some means of resolving this impedance conflict must be provided before the two circuits can be coupled to a common coil.

In the prior art, this conflict of impedance requirements was resolved by coupling impedance matching transformers in series with the input or output circuits as shown, for example, on page 354 of the book "Electronic Digital Computers," by Charles V. Smith, published in 1959 by the McGraw-Hill Company. These transformers, however, introduced some serious limitations into the reading/writing circuit. In the first place, the response of a transformer varies with pulse length, which is a serious handicap in non-return-to-zero writing systems, in which pulse length varies according to the binary number represented thereby. Furthermore, transformers are quite expensive compared to other circuit components, particularly when they are designed to pass square pulses such as used in digital computers. In addition, transformers are inefficient in terms of power transfer and they introduce unnecessary distortion into the reading and writing signals.

Accordingly, one principal object of this invention is to provide a direct coupled magnetic reading/writing circuit in which the conflict between relatively large writing currents and relatively small reading currents is resolved in a transformerless circuit arrangement.

Page 354 of the above- noted book also shows a prior art channel selector system as used in combination with said prior art reading/writing circuit. This channel selector system utilizes diffused-junction diodes which are normally back-biased by a negative anode potential, and which are forward biased by selection signals to open the corresponding winding to reading or writing currents. Since each of the windings are coupled to the anode of a diode it is apparent that the reading and writing currents will flow in the reverse direction through one diode. This is made possible by a unique property of diffused junction diodes—their ability to conduct large back currents for a short time period following the application of a forward bias. These diffused junction diodes, however, introduce serious limitations into the channel selector system. In the first place, the switching time of diffused junction diodes is long with respect to the switching time of other semiconductor diodes, whereby the prior art circuits are relatively limited in switching speed. Furthermore, the reading and writing currents can flow only in the time period in which the diffused junction diodes will pass large back currents. Since this time period is relatively short, these prior art circuits are also relatively limited with respect to maximum reading and wiriting times.

Accordingly, another principal object of this invention is to provide a channel selector system which has (1) a faster switching action than heretofore known in the art and (2) no limitation with respect to the time duration of signals passed therethrough.

Other objects and advantages of the invention will be apparent to those skilled in the art from the following description of one illustrative embodiment thereof, in connection with the attached drawings, in which.

Figure 1:
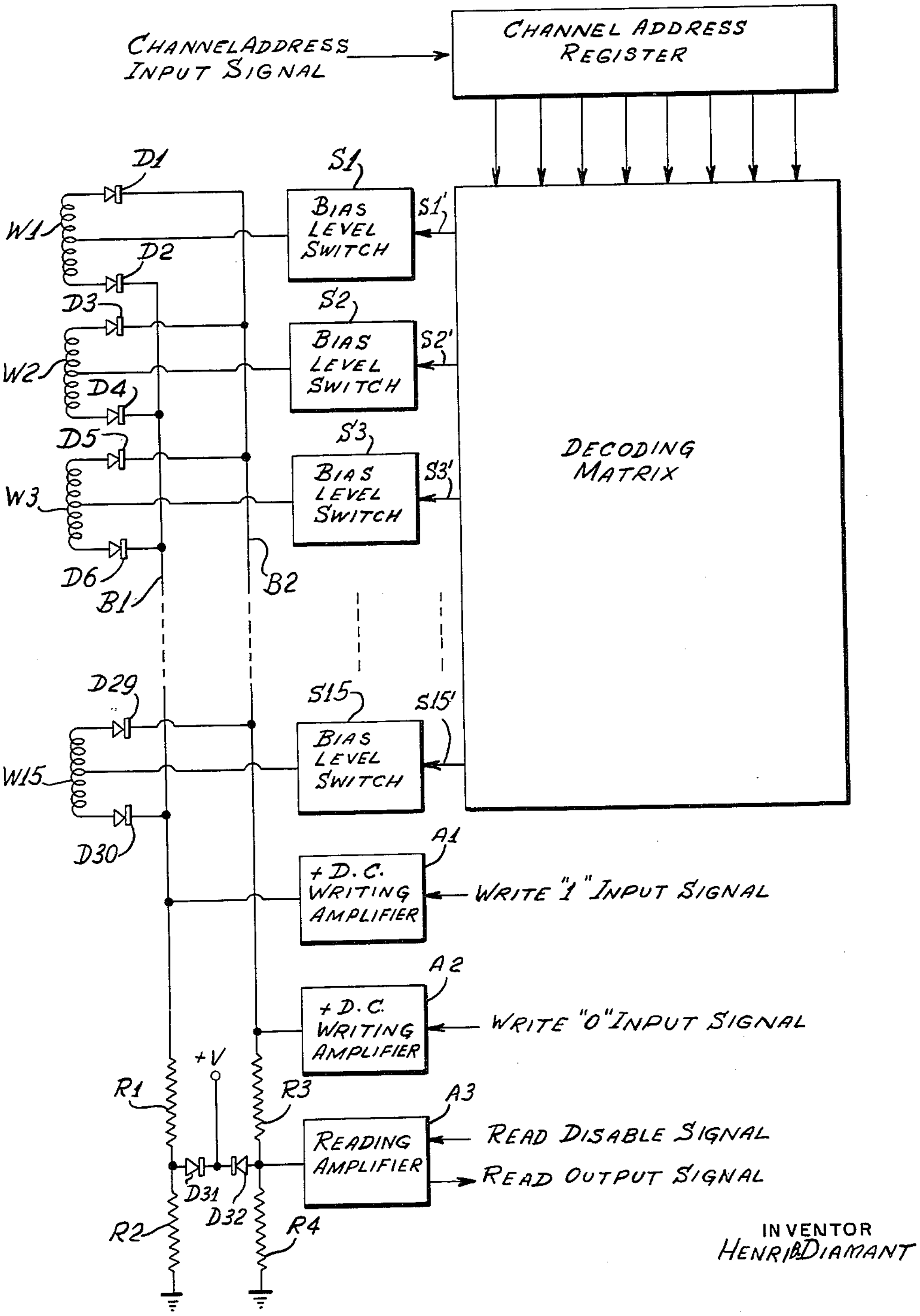
FIG. 1 is a partial schematic of one embodiment of the invention.

In general terms, the writing portion of this invention contemplates the use of two D.C. writing amplifiers, one coupled to either end of a center tapped winding whose center tap is returned to both amplifiers. Current is driven through one half of the winding to write a logical 1 and through the other half of the winding to write a logical 0. The writing amplifiers are preferably coupled to their respective end of the winding through series current limiting resistors, which are preferably shunted by current commutating capacitors to speed the build-up of writing current in the windings. Ringing of the windings is prevented by pair of diode switches which short a critical damping resistance across respective halves of the winding whenever the current therein is interrupted.

The reading portion of this invention comprises a D.C. reading amplifier coupled in parallel with one of the writing amplifiers across one half of the winding. The input impedance of the reading amplifier is high with respect to the winding, which automatically isolates the reading amplifier from excessive currents or voltages during the writing process. If necessary, though, the reading amplifier can be further protected by clamping diodes in its input circuit. In a preferred embodiment of the invention, the first stage of the reading amplifier comprises a transistor whose emitter-collector circuit is coupled in series with the writing current input.

The channel selector portion of this invention comprises a plurality of center tapped windings whose ends are coupled to a pair of bus conductors through coupling diodes. Two common driving circuits are provided, one coupled to each bus conductor, and the null output level of each driving circuit is set to normally back bias each of the coupling diodes. An independent bias level switch is coupled to the center tap of each winding, and the bias level switches are all returned to the two driving circuits. Each bias level switch is independently switchable between a first output level which back biases the corresponding coupling diodes and a second output level which forward biases the corresponding coupling diodes. Thus each winding is disconnected from the two bus conductors when the corresponding bias level switch is at its first output level, but it can be connected to the bus conductors by switching the bias level switch to its second output level.

The bias level switches are normally set to their first output level, which disconnects all of the windings from the bus conductors, and are selectively switched to their second output level by a decoding matrix which actuates the bias level switch signified by an address input signal. This connects a selected winding to the two bus conductors, and signal current can then be driven through either half of the selected winding as long as the bias level switch remains at its second output level. In pulse circuit applications, such as described below, the bus conductors are preferably terminated in a pair of critical damping resistors which are shorted, by switching diodes, across either half of the windings when the signal current therein is terminated. These damping resistors prevent ringing in the windings. In the specific embodiment of the invention to be described, the channel selector system is closely interrelated with the reading/writing circuit, so it should be noted here that the channel selector system is not limited to digital circuits or to random access systems. It can also be used in connection with continuously modulated driving signals, and can be used as a time multiplexing or commutation circuit.

FIG. 1 shows one embodiment of the invention that is adapted for use in a digital computer containing a plurality of magnetic reading/writing heads, not shown, which are coupled to a corresponding plurality of center-tapped windings W1 . . . W15. It will be understood by those skilled in the art that windings W1 . . . W15 are each wound on the core of a corresponding magnetic head, and that each head is positioned over a corresponding channel on a magnetic drum or tape storage element. It will also be understood that a binary 1 is written onto the storage element by passing current in one direction through the windings, and that a binary 0 is written onto the storage element by passing current in the other direction through the windings. These writing currents magnetize the surface of the storage element in one direction or the other, and the resulting magnetization will in turn induce small currents in the windings to reproduce the information on the magnetized surface.

Windings W1 . . . W15 are coupled in parallel to two bus conductors B1 and B2 through corresponding coupling diodes D1 . . . D30, which are preferably fast-switching semiconductor diodes of the point contact type. A pair of common D.C. writing amplifiers A1 and A2 are directly coupled to a corresponding bus conductor, and the null output voltage level of each amplifier is set to apply a back bias potential to all of the corresponding coupling diodes. The center-taps of windings W1 . . . W15 are coupled to corresponding bias level switches S1 . . . S15, which are returned by means not shown to writing amplifiers A1 and A2 to form a complete circuit for writing current, which flows from either one of the writing amplifiers through one half of the selected winding and thence through the bias level switch back to the writing amplifier. It will be readily understood by those skilled in the art that this current return path can be provided by connecting all of the circuits to a common chassis ground, not shown, or by energizing the circuits from a common power supply, not shown.

Each of the bias level switches S1 . . . S15 are independently switchable between a first output voltage level which is chosen to back bias the associated coupling diodes and a second output voltage level which is chosen to forward bias the associated coupling diodes. These voltage levels must, of course, be selected in view of the null output voltage levels of writing amplifiers A1 and A2 to achieve this desired end. In the specific embodiment shown, the null output voltages of amplifiers A1 and A2 are positive, so the first output level must be a less positive voltage and the second output level a more positive voltage. Each bias level switch normally rests at its first output voltage level, and is switchable to its second voltage level in response to selection signals from a decoding matrix, which actuates the bias level switch corresponding to the channel signified by a channel address input signal. The channel address signal, which can be any suitable coded signal, is stored in a channel address register coupled to the decoding matrix.

In the embodiment shown in FIG. 1, the process of writing is carried out as follows: a channel address signal that specifies the desired writing channel is entered into the channel address register by means not shown. The channel address signal, which is usually presented in a binary code, is decoded in the decoding matrix, which actuates the bias level switch corresponding to the channel signified by the address signal. This bias level switch then connects the selected winding to the bus conductors by forward biasing the corresponding pair of coupling diodes. The selected winding is then ready to receive pulses of writing current from either of the two writing amplifiers, each of which produces a negative-going output pulse when triggered by their respective writing input signals. These pulses, of course, must not fall below the first output voltage level of the bias level switches, or they will forward bias the other coupling diodes, which must remain back biased to isolate the writing currents to the selected winding.

Since writing amplifiers A1 and A2 are coupled to opposing ends of windings W1 . . . W15, their negative-going output pulses drive current in opposing directions through the windings, one direction signifying a binary 1 and the other a binary 0. The writing current flows, as explained above, through each writing amplifier, the corresponding half of the selected winding, the corresponding bias level switch, and back to the writing amplifiers. When the writing pulses end, ringing in the winding is prevented by damping resistors R1 and R3, which are shorted across the windings by diodes D31 and D32, which are normally back biased by +V, but which become forward biased by the self induced voltages in the windings. Resistors R1 and R3 are selected to critically damp the windings. It will be understood by those skilled in the art that +V is returned to the other circuits by a common ground.

A reading amplifier A3 is directly coupled in parallel with writing amplifier A2 across an input impedance R4, which is large with respect to R1 and R3. A balancing resistor R2, is coupled in parallel with writing amplifier A1 to balance the circuit. Resistors R2 and R4 act as current limiting resistors for the forward-bias current of their respective coupling diodes. When a selected winding is coupled to the bus conductors, as described above, writing currents induced in the selected winding flow through R4, generating relatively high reading voltages which are amplified in reading amplifier A3. Reading amplifier A3 is set for class A operation with respect to these signals so that it will respond to signals of either polarity. A read disable signal is preferably provided to disable the reading amplifier when the writing amplifiers are operating, and clamping diodes can be provided, if necessary, to protect the reading amplifier circuits from excessive voltages during the writing times.

Since the reading amplifier is coupled to only one end of the windings, it is apparent that the forward bias on the coupling diodes must therefore be higher than the reading voltages induced in the windings; otherwise one of the induced voltages would back bias the coupling diodes. And it should be noted that the reading current through resistor R4 does not actually reverse; it swings above and below a static input value determined by the forward bias on the coupling diodes and the resistance of resistors R3 and R4. In the reading amplifier, of course, the static input current corresponds to the zero input level, whereby rises in the current signify one binary state and drops signify the other binary state.

It will be understood, of course, that the digital computer circuit contains synchronizing means, not shown, for timing the writing signals to coincide with predetermined sectors of the magnetic storage surface so that the stored information can be later extracted by moving that particular sector of the storage surface under the reading coil. The storage surface of each channel on a magnetic drum is divided into a plurality of radial sectors, each corresponding to a different binary word, and the sectors are divided into a plurality of small segments, each corresponding to one bit of binary information. Therefore, in the overall computer operation writing does not begin until the sector corresponding to the desired word appears under the selected writing head, and the writing pulses are timed to enter the appropriate binary magnetization in each bit segment of the selected sector as it passes under the writing head. In some writing systems, which are called "return to zero" or RZ writing systems, a short pulse of writing current is passed through the writing head when it is in the center of a bit segment, and the writing current returns to zero in between bit segments. In other writing systems, which are called "non return to zero" or NRZ writing systems, the writing current is maintained for the full length of each bit segment, and does not stop until the binary input signal changes, in which case the current changes its polarity, as quickly as possible. This invention is applicable to either of these two writing systems, but it is more valuable in NRZ writing systems because the writing pulse length varies as a function of the binary information in NRZ systems. The binary word 11111011 would be represented in an NRZ system by one five-unit positive pulse followed by a 1-unit negative pulse and one two-unit positive pulse. In a RZ system, the same word would be represented by a sequence of five narrow positive pulses followed by 1 narrow negative pulse and two narrow positive pulses. It can be seen, then, that the virtues of direct-coupled reading and writing amplifiers are more important in NRZ systems than in RZ systems.

The reading process is also timed by the same synchronizing means so that the reading amplifier will remain disabled until the radial sector corresponding to the desired word appears under the selected reading head. Thus the read disable signal coupled to amplifier A3 of FIG. 1 will not only be present during the writing operation, but also in all sectors of the storage surface that does not correspond to the desired word. There are many ways of accomplishing the above described synchronization, but they will not be disclosed herein because this invention is independent of computer synchronization. The basic functions of this invention are (1) to connect the appropriate winding to the bus circuit in response to a channel address signal, (2) to produce output signals corresponding to currents induced in the selected winding, and (3) to drive current in one direction or the other through the selected winding in response to input signals. These functions can be performed in connection with any kind of synchronization or even in the absence of synchronization.

Figure 2:
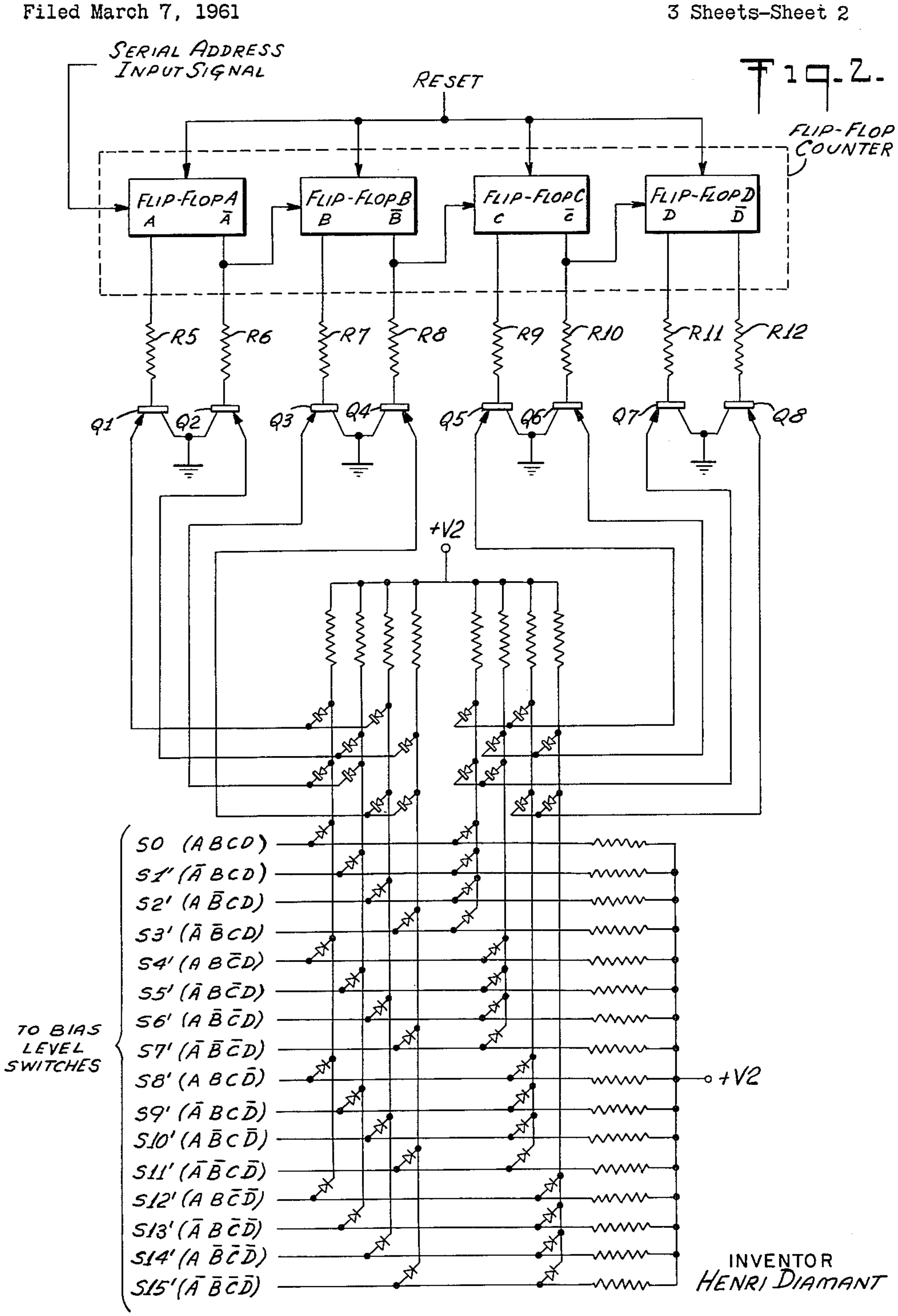
FIG. 2 is a schematic of the channel address register and decoding matrix shown in FIG. 1.

FIG. 2 shows one suitable circuit arrangement for the channel address register and decoding matrix shown in FIG. 1. In this particular circuit the channel address register comprises a 4 stage flip-flop counter containing flip-flops A, B, C, and D which are coupled in cascade through coupling diodes, not shown, to form a standard 16-state counter. Each flip-flop has two output signals, a count output (unbarred) and a complementary output (barred), which switch between ground and a fixed positive potential each time the flip-flop changes state. These output signals are coupled through resistors R5 . . . R12 to emitter followers Q1 . . . Q8, which isolate the flip-flops from the diode decoding matrix.

The flip-flop counter steps through a sequence of 16 distinct states each of which is characterized by a different combination of output signals. In the initial counter state, which is established by a reset signal applied to each flip-flop, the positive voltage level is present on the count output conductors (A, B, C, and D) and the ground output level on the complementary output conductors ($\overline{A}$, $\overline{B}$, $\overline{C}$, and $\overline{D}$). With each input pulse applied to flip-flop A, the counter will advance by one step in its sequence, returning to its initial state on the 16th input pulse. The counter output states for each step of the sequence are shown in FIG. 2 by the letters in parentheses, which indicate the counter output conductors that are at the positive potential level in the corresponding step. The channel address input signal is a simple sequence of pulses whose number is equal to the selected channel number, so for any given channel address signal the counter will come to rest at the state corresponding in number to the selected channel.

The decoding matrix has 8 input conductors, one corresponding to each counter output signal, and 16 output conductors, one corresponding to each counter state. Each output conductor is coupled through diodes to four of the eight emitter followers Q1 . . . Q8. The circuit is arranged such that each output conductor will be grounded whenever one of its emitter followers is grounded and will be at +V2 whenever all of its emitter followers are high. Thus each output conductor develops a positive output voltage in response to a coincidence of positive voltages in its four emitter followers, and each output conductor is coupled to the 4 transistor switches that will be positive in the corresponding counter state. For example, in counter state five transistors Q2, Q3, Q6, and Q7 are high and the other transistors are grounded. It can be seen that every output conductor except S5' is coupled to one of the grounded transistors, and therefore that every output conductor except S5' in counter state 5 will be grounded. Thus the decoding matrix produces a positive output voltage +V2 on the output conductor corresponding to the counter state at any given time and a ground on all other output conductors.

Figure 3:
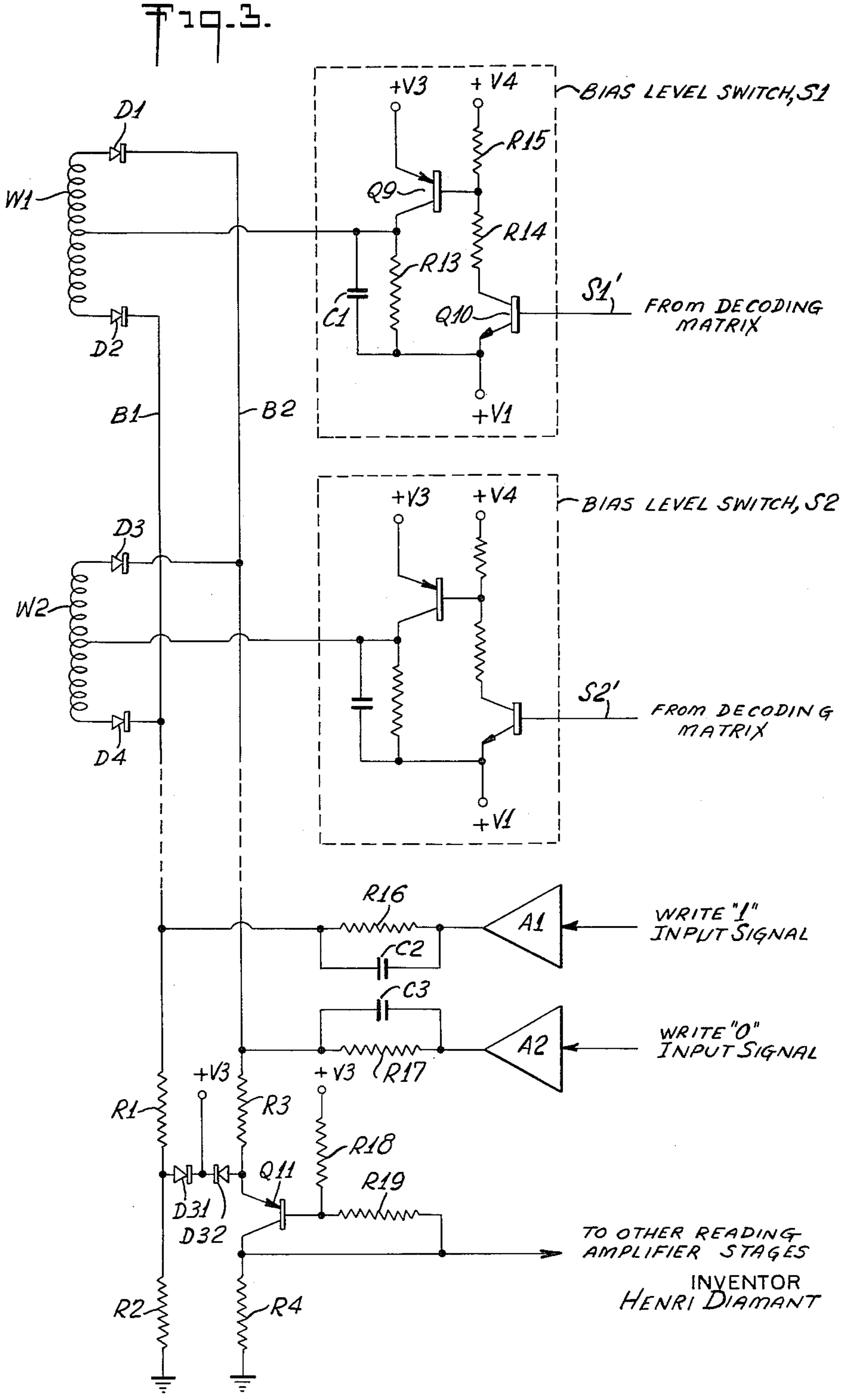
FIG. 3 is a schematic of the bias level switch shown in FIG. 1 and a partial schematic of the reading and writing amplifiers shown in FIG. 1.

The output conductors S1' . . . S15 of the decoding matrix are coupled to corresponding bias level switches, which can be mechanized as shown in FIG. 3. Each bias level switch contains an NPN input transistor and a PNP output transistor. Referring to bias level switch S1 in FIG. 3, NPN transistor Q10 is cut off by a positive emitter potential +V1 when its base input signal S1' from the decoding matrix is at ground. Bias potential +V1 is, of course, lower than the positive output voltage +V2 of the decoding matrix, so that transistor Q10 will be biased into conduction when its base is raised to +V2. All of the voltages in FIGS. 2 and 3 are numbered in accordance with their magnitude, V3 being larger than V2, and V4 larger than V3. When Q10 is cut off, the base potential of Q9 will be +V4, and Q9 will also be cut off, thereby applying +V1 to the center tap of winding W1 through resistor R13. This applies a forward bias of +V1 to the anodes of coupling diodes D1 and D2, but this forward bias is nullified by a larger positive potential applied to the cathodes of D1 and D2 from D.C. amplifiers A1 and A2. Therefore, when conductor S1' of the decoding matrix is grounded, Q9, Q10, D1, and D2 will all be cut off, and winding W1 will be isolated from bus conductors B1 and B2.

When conductor S1' of the decoding matrix switches to +V2, Q10 goes into conduction and drops the base of Q9 below +V3, whereupon Q9 conducts and couples +V3 to the center tap of winding W1. Diodes D1 and D2 then go into conduction, connecting winding W1 to bus conductors B1 and B2, and the circuit is ready for reading or writing on channel 1 as described above. When the base of Q10 is switched back to ground, all of the transistors and diodes revert to their cutoff condition, and winding W1 is again disconnected from bus conductors B1 and B2. Capacitor C1, which is an RF bypass capacitor, provides a low impedance path for the sharp writing waveforms and resistors R14 and R15 form a voltage divider network which sets the base level of Q9 to the appropriate level when Q10 conducts. The other bias level switches are identical to bias switch S1 in every respect, and operate in the same manner to connect their respective windings to bus conductors B1 and B2.

FIG. 3 also shows one suitable output circuit arrangement for writing amplifiers A1 and A2 and one suitable input circuit arrangement for reading amplifier A3. In the latter circuit a PNP transistor Q11 is connected with its emitter-collector circuit in series with bus conductor B2 between small resistance R3 and large resistance R4. In this circuit arrangement the emitter-collector impedance of Q11 forms a part of the split impedance of bus conductor B2, so to balance the bus circuit large resistance R2 must be equal to R4 plus the emitter-collector impedance of Q11. A voltage divider network comprising resistors R18, R19, and R4 sets the base and collector voltages of Q11 for class A operation when one of the windings has been selected, which applies a potential of +V3 to bus conductor B2. Input signals are injected into the emitter of Q11, and output signals are taken across R4. Diode D32 protects Q11 from the large writing currents and inductive kick-back voltages without impairing its response to the small reading currents.

In the output circuit of writing amplifiers A1 and A2 series resistors R16 and R17 are current limiting resistors selected in accordance with the desired writing current level. Commutating capacitors C2 and C3 momentarily short their respective resistors at the start of a writing pulse, thereby speeding the build up of writing current. Amplifiers A1 and A2 can be any suitable D.C. amplifier circuits which are adapted to produce negative-going output signals, and their null output level is set high enough to normally back bias all of the coupling diodes D1 . . . D30. With the circuit arrangement of FIG. 3, a null output level of +V3 works very nicely.

From the foregoing decription it will be apparent that this invention provides a novel direct-coupled reading/writing circuit for a magnetic storage system and a novel channel selector system for selectively coupling any one of a plurality of windings to a common circuit. And it should be understood that this invention is by no means limited to the specific structures disclosed herein by way of example, since many modifications can be made therein without departing from the basic teaching of this invention. For example, the channel address register, decoding matrix, and bias level switches could be replaced by a relay network if desired, and many alternate electronic circuits could be used in place of the specific transistor circuits shown for these units. Furthermore, the reading/writing and channel selector portions of this invention are not necessarily interrelated as shown in the figures; they can be used independently of each other if desired. The reading/writing circuit can be used in connection with a single magnetic reading/writing head, which obviously does not require a channel selection system. And the channel selection system is not limited to reading/writing circuits; it can be used, for example, to selectively couple any D.C. driving circuit to a plurality of windings, either in response to a channel address signal or in a predetermined time sequence. In the examples shown in FIG. 2, the channel address system can be adapted for time sequencing or multiplexing by the simple expedient of connecting a clock signal to the input of the flip-flop counter in place of the channel address signal shown. In addition, it is not necessary to use center-tapped windings; single ended windings can be used, with the bias level switches being connected to the center of a resistance bridge coupled between the anodes of the two coupling diodes. These and many other modifications will be apparent to those skilled in the art, and this invention includes all modifications falling within the scope of the following claims.

I claim:

1. A magnetic reading/writing circuit comprising a magnetic reading/writing head containing a center-tapped winding, a first writing amplifier direct coupled to one end of the winding, a second writing amplifier direct coupled to the other end of the winding, the center tap of the winding being direct coupled to both of said writing amplifiers, each of said writing amplifiers being operable when triggered to apply an output voltage pulse to their corresponding end of the winding, each of said output voltage pulses being operable to drive current through a corresponding half of the winding, and a reading amplifier direct coupled to one end of said winding.

2. A magnetic reading/writing circuit as defined in claim 1 and also including a first damping resistor and a first switching diode coupled in series across one half of the winding and a second damping resistor and a second switching diode coupled in series across the other half of the winding, said damping resistors each having a resistance value selected to critically damp the corresponding half of the winding when connected thereacross, and said switching diodes being connected in such polarity as to cut off in response to an output voltage pulse applied to their corresponding half of the winding and to conduct in response to the back E.M.F. induced therein when said output voltage pulse ends.

3. A magnetic reading/writing circuit as defined in claim 2 wherein said damping resistors are each connected at one end to the corresponding end of the winding and at the other end to one electrode of the corresponding diode, and also including a third and a fourth resistor connected in series between said other ends of said damping resistors, said third and fourth resistors being approximately equal in resistance value and having a relatively high resistance value with respect to said damping resistors, and wherein said reading amplifier is coupled across one of said third and fourth resistors.

4. A magnetic reading/writing circuit as defined in claim 3 wherein said writing amplifier comprises a transistor having its emitter-collector circuit coupled in series between one of said third and fourth resistors and the corresponding other end of said damping resistors, the amplifier output being taken across the corersponding one of said third and fourth resistors.

5. A magnetic reading/writing circuit comprising a plurality of magnetic reading/writing heads each containing a center-tapped winding, one end of each winding being coupled through a corresponding coupling diode to a first bus conductor and the other end thereof being coupled through a corresponding coupling diode to a second bus conductor, a first writing amplifier direct coupled to said first bus conductor and a second writing amplifier direct coupled to said second bus conductor, each of said writing amplifiers being operable when triggered to apply an output voltage pulse to the corresponding bus conductor, said output voltage pulses being identical in polarity and each of said coupling diodes being connected to conduct in the direction indicated by the polarity of said output voltage pulses, head selection means direct coupled to the center tap of each winding and to both of said writing amplifiers, said head selection means being adapted to normally apply a back bias potential to each of said coupling diodes via the center tap of the corresponding winding and being operable to apply a forward bias potential to one pair of said coupling diodes in response to a head selection signal applied thereto, said back bias potential being greater in magnitude than either of said output voltage pulses and said forward bias potential being smaller in magnitude than either of said output voltage pulses, said output voltage pulses being operable to drive current through the corersponding half of any winding whose coupling diodes are forward biased by said forward bias potential and being blocked from all other windings by said back bias potential, and a reading amplifier direct coupled to one of said bus conductors.

6. A magnetic reading/writing circuit as defined in claim 5 and also including a first damping resistor and a first switching diode coupled in series between one bus conductor and said head selector means and a second damping resistor and a second switching diode coupled in series between the other bus conductor and said head selector means, said damping resistors each having a resistance value selected to critically damp the corresponding half of a winding when connected thereacross, and said switching diodes being connected in such polarity as to cut off in response to an output voltage pulse applied to their corresponding half of the winding and to conduct in response to the back E.M.F. induced therein when said output voltage pulse ends.

7. A magnetic reading/writing circuit as defined in claim 6 wherein said damping resistors are each connected at one end to the corresponding bus conductor and at the other end to one electrode of the corresponding switching diode, and also including a third and a fourth resistor connected in series between said other ends of said damping resistors, said third and fourth resistors being approximately equal in resistance value and having a relatively high resistance value with respect to said damping resistors, and wherein said reading amplifier is coupled across one of said third and fourth resistors.

8. A magnetic reading/writing circuit as defined in claim 7 wherein said head selection means comprises a plurality of bias level switches each coupled between the center tap of a corresponding winding and both of said writing amplifiers, each bias level switch being adapted to normally apply said back bias potential to its corresponding center tap and being operable, when actuated, to apply said forward bias potential thereto, and bias switch selection means adapted to actuate a selected bias level switch in accordance with the reading/writing head signified by a head selection signal applied thereto.

9. A magnetic reading/writing circuit as defined in claim 8 wherein said writing amplifier comprises a transistor having its emitter-collector circuit coupled in series between one of said third and fourth resistors and the corresponding other end of said damping resistors, the amplifier output being taken across the corresponding one of said third and fourth resistors.

10. A magnetic reading/writing circuit as defined in claim 9 wherein said bias switch selection means comprises a decoding matrix having a plurality of input conductors and a plurality of output conductors, each output conductor thereof being coupled to a corresponding bias level switch, each of said bias level switches being adapted to actuate in response to a selection voltage applied to the corresponding output conductor, and said decoding matrix being operable to apply a selection voltage to the output conductor signified by a coded head selection signal applied to the input conductors thereof.

References Cited in the file of this patent

UNITED STATES PATENTS 2,910,671 Best ________________ Oct. 27, 1959
2,927,304 Paquin ______________ Mar. 1, 1960